United States Patent [19]

Sakamoto

[11] Patent Number: 4,468,442
[45] Date of Patent: Aug. 28, 1984

[54] METHOD FOR MANUFACTURING HALF-TONE PRINTING PLATES

[75] Inventor: Takashi Sakamoto, Kyoto, Japan

[73] Assignee: Dainippon Screen Mfg. Co., Ltd., Kyoto, Japan

[21] Appl. No.: 403,851

[22] Filed: Jul. 30, 1982

[30] Foreign Application Priority Data

Aug. 11, 1981 [JP] Japan .................. 56-126307

[51] Int. Cl.$^3$ .............. G03B 27/72; G03B 27/76; G03B 72/32; G03B 27/42
[52] U.S. Cl. .................. 430/30; 355/35; 355/38; 355/50; 355/53; 355/68; 355/69; 355/77
[58] Field of Search .............. 430/30, 302, 394; 355/35, 38, 50, 53, 68, 69, 77

[56] References Cited

U.S. PATENT DOCUMENTS 4,025,189  5/1977  Pugsley .................. 355/38

FOREIGN PATENT DOCUMENTS 52-33523  8/1977  Japan .

Primary Examiner—Richard L. Schilling
Attorney, Agent, or Firm—Brumbaugh, Graves, Donohue & Raymond

[57] ABSTRACT

The proposed method for making half-tone images on printing plates comprises a step of individually controlling light beams to switch them on and off according to whether a reference value representing a photographic density of minute point of an original picture is or is not smaller than numeral signals allotted to many divisional elements constituting each of many small dots, wherein a unit area corresponding to single dot area is divided into plural fine network patterns each having its own tone reproduction characteristic different from those of other patterns whereby the resulting soft dots can be dot-etched for color retouching of the half-tone images.

4 Claims, 12 Drawing Figures

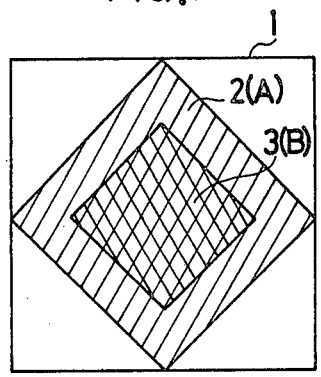
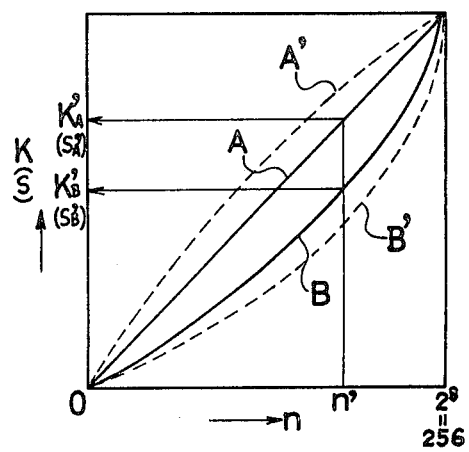

| 255 | 252 | 239 | 234 | 203 | 204 | 151 | 180 | 143 | 186 | 179 | 230 | 223 | 244 | 251 | 255 |
|-----|-----|-----|-----|-----|-----|-----|-----|-----|-----|-----|-----|-----|-----|-----|-----|
| 250 | 243 | 239 | 211 | 210 | 159 | 78  | 111 | 159 | 139 | 191 | 187 | 226 | 231 | 247 | 247 |
| 235 | 236 | 215 | 215 | 167 | 175 | 103 | 140 | 83  | 154 | 135 | 196 | 195 | 228 | 227 | 242 |
| 231 | 201 | 212 | 171 | 172 | 95  | 135 | 59  | 118 | 75  | 148 | 131 | 199 | 91  | 223 | 219 |
| 199 | 267 | 163 | 170 | 87  | 130 | 51  | 78  | 39  | 102 | 67  | 143 | 127 | 194 | 183 | 218 |
| 202 | 155 | 167 | 91  | 126 | 43  | 62  | 23  | 46  | 31  | 86  | 63  | 146 | 123 | 188 | 176 |
| 147 | 64  | 99  | 132 | 47  | 54  | 15  | 22  | 11  | 30  | 27  | 94  | 71  | 151 | 179 | 83  |
| 162 | 107 | 138 | 55  | 70  | 19  | 14  | 3   | 6   | 7   | 38  | 35  | 110 | 79  | 156 | 115 |
| 113 | 155 | 77  | 106 | 33  | 34  | 5   | 2   | 1   | 10  | 17  | 66  | 53  | 136 | 185 | 169 |
| 182 | 117 | 150 | 69  | 90  | 25  | 26  | 9   | 18  | 13  | 50  | 45  | 131 | 97  | 163 | 146 |
| 173 | 87  | 121 | 144 | 61  | 82  | 29  | 42  | 21  | 58  | 44  | 122 | 89  | 156 | 153 | 200 |
| 216 | 181 | 192 | 125 | 142 | 65  | 98  | 37  | 74  | 49  | 28  | 85  | 168 | 161 | 206 | 197 |
| 217 | 222 | 189 | 195 | 129 | 147 | 73  | 114 | 57  | 134 | 93  | 171 | 169 | 211 | 205 | 240 |
| 240 | 226 | 227 | 193 | 175 | 133 | 152 | 81  | 139 | 101 | 174 | 165 | 214 | 213 | 235 | 233 |
| 245 | 246 | 229 | 224 | 185 | 190 | 137 | 158 | 109 | 176 | 151 | 208 | 209 | 238 | 241 | 248 |
| 254 | 249 | 243 | 34  | 219 | 177 | 187 | 141 | 179 | 149 | 203 | 201 | 232 | 237 | 251 | 253 |

9(A∘B)

FIG.8
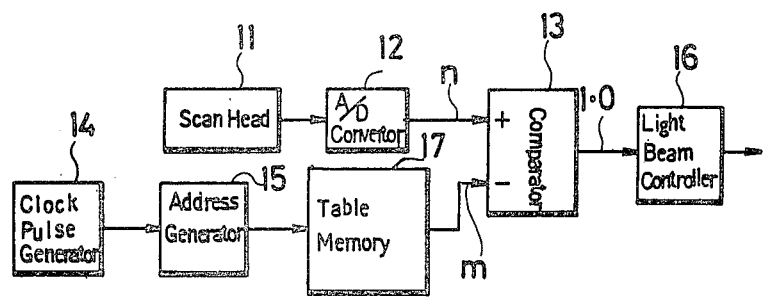
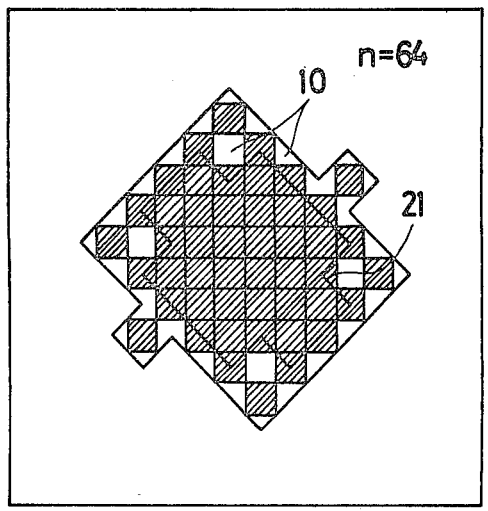
FIG.9
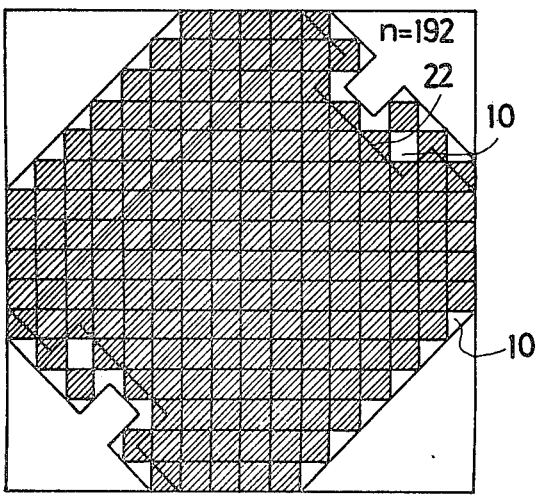
FIG.10

METHOD FOR MANUFACTURING HALF-TONE PRINTING PLATES

BACKGROUND OF THE INVENTION

The present invention relates to a method for manufacturing half-tone image areas required in printing in conformity with original pictures of continuous tone, and more particularly to a method for manufacturing half-tone image areas consisting of many small dots which can be treated by the dot etching technique developed for the half-tone process.

The original pictures of continuous tone have heretofore been converted into the half-tone images by means of the image scanning recorder such as panchromatic or monochromatic scanner. To put it concretely, either a method utilizing a contact screen or a method called the dot generator system has been used, the latter method being an electronic technology for making said small dots. In the former photographic method, a large intensity of exposure light as well as a complicated vacuum apparatus for the vacuum contact are needed so that the apparatuses as a whole becomes large-sized and expensed. The other problem in the photographic method exists in the application of lith-films the exposure and processing of which should be very precisely controlled. There may be a disadvantage also in the known electronic method such as shown in the Japanese Patent Publication No. Sho. 52-33523. Namely, each of the small dots thus produced has a so extremely small fringe width that it is classified as a hard dot which is not suitable for an original film utilized in plate making process, whereas the photographically produced dots have sufficiently wide fringe zones surrounding the central main portions thereof. The lack or scarcity of the fringe is caused by the fact in said electronic method that both the central and circumferential portions of each of the small dots are exposed evenly to the light of the same intensity. The scarcely fringed dots cannot be processed by the dot etching technique required for the color retouching additionally performed depending on the result of color separation tests. In said known dot etching process, the silver layer forming the small dots of half-tone film is etched partially or entirely over the whole image area in order to render the dots smaller (however, in the half-tone negative film, the dots becomes larger in the printed objects). The abovementioned hard dots can be dot-etched only to an insufficient degree of effect because the deposited silver amounts are not so varied between the central and the circumferential portions in each of said dots. That is to say, it is difficult to render the dots smaller gradually from their circumferential portions, and if the dot etching is forcedly continued the silver amount of the central portion in each dot will be undesirably reduced at the same time so that the half-tone image consisting of such dots becomes unfit for use. For the purpose of solving the above problem, an apparatus has been proposed in the U.S. Pat. No. 4,025,189, the apparatus being constructed such that the exposure intensity of light beam to the circumferential portion in each of said small dots is controlled to be lower than that to the central portion. The small dots produced in this manner are considerably similar to the gradated dots that have been photographically produced. In the other words, the proposed apparatus is suitable for making half-tone images consisting of such dots that have fringes on their circumferential portions, which fringes can be dot-etched, if necessary. In the above apparatus, the sums of (or the differences between) the image signal values originating from the original picture and the signal value from the screen pattern generator are made use of. The above sums (or differences) for the translational light beams positioned at the right and left hand, in close proximity to each other, are compared with one another for each beam to judge the relation therebetween. In case that both the sums (or differences) indicate the same condition, i.e. exposure or non-exposure, the light beam will be controlled to be in full exposing or non-exposing condition. In the other case, namely when they indicate different conditions for the right and left beams, a value c will be calculated by means of the following equation;

$$c = \frac{a+b}{|a-b|}$$

where a and b are respectively the sums (or differences) for the right and left beams. According to the level of said value c, the exposure is effected with a variable intermedium intensity. The apparatus, therefore, must comprise a complicated circuitry including an adder (or subtraction circuit), an absolute valve circuit together with a division circuit. The digital processing for obtaining the quotients reeds a considerably longer time so that the apparatus would be considered more or less unsuitable, in future, for utilization in the scanners for plate making process where there is a requirement or need of a higher speed.

BRIEF SUMMARY OF THE INVENTION

An object of the invention is to solve the problem described above.

Another object of the invention is to improve the quality of small dots produced in the electronic preparation of half-tone images.

Still another object of the invention is to provide an improved method of making the half-tone printing plates, the method being intended for an application in the known process where half-tone images are produced in such a manner that, as shown in the above Japanese Patent Publication No. Sho. 52-33523, the plural, for instance five fine lighting points disposed above the recording film in a direction crossing the scanning direction of the light beam might be independently controlled to be switched on and off in accordance with the image signals from the original picture (whereas, in the Japanese Publication No. Sho. 52-33523, the dot signals corresponding to the image signals are utilized in place of the latter).

A further object of the invention is to provide an improved method for making a half-tone image consisting of small dots having, in contrary to those made according to the Japanese Publication No. Sho. 52-33523, fringes on the circumferential portions thereof, wherein said dots are similar in their shape to the gradated dots formed photographically.

A still further object of the invention is to provide an improved method for making a half-tone image wherein a unit area corresponding to a single dot is divided into plural fine network patterns that have different tone reproduction characteristics, and are respectively composed of minute sections not overlapping each other, thereby the signal values m from said sections being related to the corresponding exposure zones on a film, and being compared with reference values n corresponding to the portions of an image that is to be reproduced for record. Each of the small dots thus produced will be provided on its circumferential portions with a fringe by utilizing the result of said comparison, the fringe thereby rendering said dot capable of being dot-etched. Consequently, the invented method for making half-tone images is remarkably advantageous in that it is simply composed and is suitable for a high speed performance.

Other objects and merits of the invention will be made clear in the following discussion of the preferred embodiments which are illustrated with reference to the accompanying drawings.

BRIEF DESCRIPTION OF THE DRAWING

FIG. 1 shows a dot recorded by the invention method at a screen angle 0°;

FIG. 2 shows an example of unit area corresponding to a single dot, the area being divided into a great number of divisional elements which form two fine network patterns;

FIG. 3 is a graph indicating the tone reproduction characteristics of each of said fine network patterns;

FIG. 4 shows an example of fine network patterns which has a checkered design and a tone reproduction characteristic A used in the invented method;

FIG. 5 shows another example of fine network patterns which has another tone reproduction characteristic B adapted to be combined with said pattern as indicated in FIG. 4;

FIG. 8 is a block diagram showing an example of the circuits used for the performance of the invented method;

FIG. 9 similarly shows another example of a dot recorded also by means of said pattern in FIG. 6 wherein the reference value n is 64;

FIG. 10 also similarly shows a still another example of a dot similarly recorded, but the reference value n being set at 192; and FIGS. 11 and 12 respectively illustrate the other examples of unit areas each corresponding to a single dot, each of the areas being divided also into a great number of divisional elements forming three of four fine network structure.

DETAILED DESCRIPTION OF THE INVENTION

Figures 6, 7:
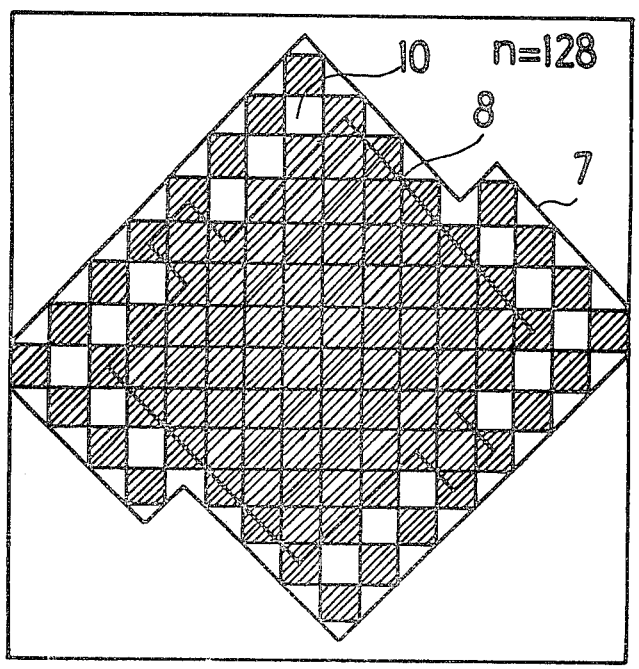
FIG. 6 shows an example of an integral fine network pattern having both the patterns of said characteristics A and B combined with each other.
FIG. 7 shows an example of a dot which is recorded by means of said combined pattern as shown in FIG. 6, the reference value n being 128.

The invention is now described further in detail with reference to the drawings. FIGS. 1, 2 and 3 illustrate the principle on which the present invention is founded. FIG. 1 schematically shows a dot recorded by the invented method at a screen angle 0°. The reference numeral 1 indicates a unit area corresponding to a single dot, the area having an area ratio of 100%. The numeral 2 indicates a fringe of a dot capable of being treated by the dot etching process. The numeral 3 shows a portion of said dot, the portion being formed with a sufficient intensity or degree of exposure so as to be resistant to said dot etching. In order to record such dot in the invention, the unit area equivalent to the single dot is divided into a great number, for instance 16×16=256, of divisional elements. Some of these elements forming a checkered design are grouped as a set A, and remaining elements being grouped as a set B also of a checkered pattern thereby the sets constituting a fine network pattern for a single dot. A different serial number is given to each of said divisional elements so that these numbers can be compared with a fixed reference value n representing one of picture signals. As shown in FIG. 3, any reference value gives different numbers K of the divisional elements or different dimensions of areas S occupied by such elements. It will be understood now that when the divisional elements having younger numbers than the reference value n are exposed to light beams corresponding thereto, a dot having a fringe portion at the peripheral zone thereof will be formed.

Figures 4, 5:
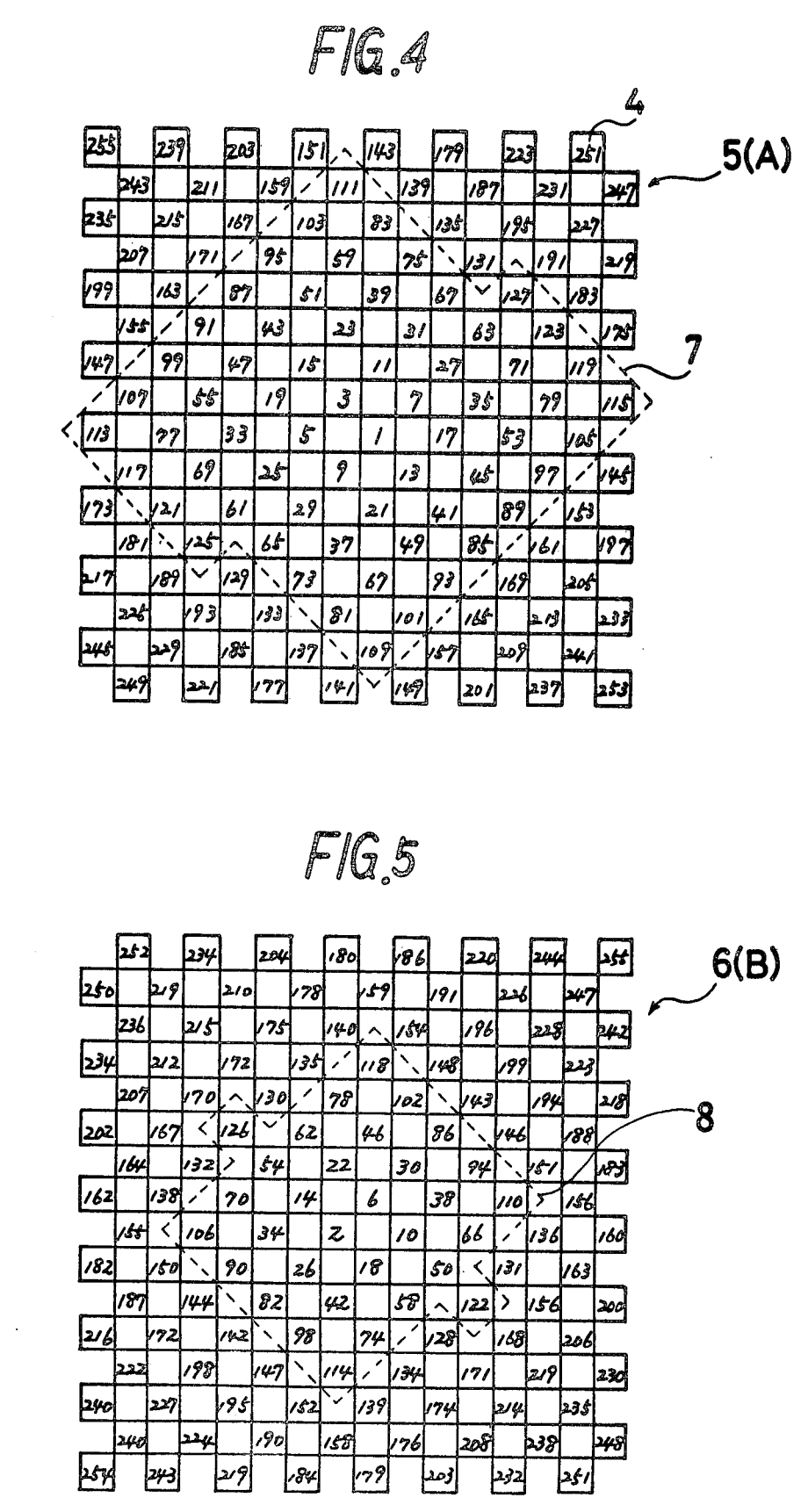

Next, the invention will be further explained more in detail with respect to FIGS. 4 to 6. The fine network pattern 5 shown in FIG. 4 has the tone reproduction characteristic A as illustrated in FIG. 3. The pattern 5 consists of many, for example 16×16=256, divisional elements 4 which are previously formed by a division of a single unit area 1 corresponding to a dot. To these elements a series of sequential numbers are given starting at the central element with the youngest number and gradually advancing to the outer elements to thereby give higher numbers thereto, until arrival at the outermost circumferential elements, whereby a numbering is accomplished to correspond to the tone reproduction characteristic A. The phantom line 7 encloses such elements 4 that have the numbers m defined by a formura $m<n$ (n=128). Thus, said line indicates a partial zone located centrally of the network pattern 5, wherein the reference value n is obtained by A/D (analog to digital) conversion of a picture signal which in turn is picked up by a photo-electric scanning of a given original picture. A circuitry for effecting the invented method will be described hereinafter. Light beams are switched on for all the elements 4 that are contained in the zone encircled with phantom line 7, wherein, as will be understood, individual comparations are done between the numbers m and the value n. It is of course that for all the other elements 4 located outside the line 7 the other light beams therefor are switched off at the same time.

On the other hand, FIG. 5 illustrates another network pattern 6 similarly having a checkered design corresponding to the other tone reproduction characteristic B as shown in FIG. 3. In the pattern 6, a central narrower zone encircled with a phantom line 8 is also a zone where for the divisional elements included therein the light beams are switched on when the reference numeral n is 128.

For actually recording a half-tone image according to the invention, it may be possible to make use of two table memories each having charged therein a different network pattern as shown in FIG. 4 or 5. It is, however, more convenient to use a single table memory that has a united network pattern 9 in FIG. 6 in which pattern both the abovementioned patterns 5 and 6 are stored.

In case that the united network structure 9 is used to record a dot for the reference value n=128, the divisional elements inside the phantom line 7 in FIG. 4 as well as the elements inside the line 8 in FIG. 5 are exposed because these elements have the sequential numbers m younger than 128. Consequently, all of the elements within the zone enclosed with line 8 are exposed to the light beams whereby each group of the blank points in the checkered patterns of tone reproduction characteristics A and B are completely filled with the exposed elements belonging to the other network pattern. The said zone treated by such a complementary exposure process will therefore becomes the pith and marrow of each dot. Contrary to this, the corcumferential range within the zone encircled with the line 7 (i.e. the range inside the line 7, but outside the line 8) is only incompletely exposed because the elements having sequential numbers shown in FIG. 4 are exposed while same shown in FIG. 5 being not exposed. Thus, a checkered appearance will be formed with the exposed elements and the non-exposed elements as seen from FIG. 7, in which the numeral 10 indicates non-exposed elements existing within said circumferential range of a dot.

FIG. 8 shows an exemplary circuit utilized in the invention. A sampling in respect of an original picture is effected by a scan head 11 of an image scanning recorder. The picked up signals are converted by an A/D convertor 12 one by one into digitalized image signals n. These signals are then fed, as said reference values, into a comparator 13 at its, for example, plus (+) terminal. On the other hand, a clock pulse generator 14 feeds a clock pulse to an address generator 15 which in turn will produce address indicating signals. The latter signals are for a table memory 17 which has the sequential numbers wrote into its predetermined addresses, the numbers belonging to a fine network pattern 9 in FIG. 6. The abovementioned numeral signals m, which correspond to each of the divisional elements constituting a dot, are took out of the required addresses of said memory device and then fed one by one into the comparator 13 at its minus (−) terminal. In the comparator 13, the value n and the numbers or numeral signals m are compared with each other in order, to thereafter feed to a light beam controller 16 a high level signal (1) when $n > m$, or a low level signal (0) when $n \leq m$.

The controller 16 controls a recorder head to switch on its light beam of the same exposure intensity when the controller receives a high level signal (1), and to switch off same when receiving a low level signal (0). A plurality of said light beam controllers 16 are provided to consist with the number of the light beams used for image recording, said number of controllers being, for instance, eight (8) and they being disposed side by side near to each other.

The diameter of said light beams on the record film surface may be set a little larger than that in recording hard tone dots (e.g. $\sqrt{2}$ times as large as the latter, when recording dots by means of the network patterns 5 and 6 as shown in FIG. 7). In this case, the exposure condition will become different from the aforedescribed one. Namely, the neighbour divisional elements in close proximity to the element to be exposed are also exposed in such a manner that the dot, e.g. the inner range encircled with the phantom line 8 in FIG. 7, will be exposed substantially two times. The outer range located out of said inner range to nevertheless fall inside the line 7 will thus be exposed almost uniformly not to assume a checkered appearance. It will be noted that it is desirable, especially in the above case, to adjust the exposure intensity in respect of each light beam to a necessary and sufficient strength for darkening the record film. The simple control system which requires only the switching on and off of said light beams renders the apparatus more simple in structure and more stable in operation. These advantages and merits cannot obtained in the known apparatus which needs a complicated circuit for a stepwise control of the light beam intensity in the circumferential range around the central portion of each dot.

FIGS. 9 and 10 illustrate two kinds of dots formed after exposure by means of the network pattern 9 and by altering the reference value n. FIG. 9 is for the case of $n=64$ while FIG. 10 being for $n=192$. As will be seen from these drawings, the dimension of dot changes in accordance with the value n compared with the signals originating from a picture. There is, in common with each other, a rule that the exposure degree for the circumferential ranges is about half of that for the pith and marrow of the dot encircled with rigid lines 21 or 22. Softer dots easy of the dot etching are produced also in these cases. In other words, the central ranges of the small dots are formed with an exposure twice as strong as that needed so that there is no unfavorable possibility that the amount of deposited silver might be diminished in the dot etching process. It is to be noted here that the width of said circumferential range capable of being dot-etched may be freely adjusted by changing the tone reproduction characteristics A and B to A' and B' respectively as illustrated in FIG. 3.

The invention can be applied with ease also to the electronical method of dots preparation as disclosed in the aforementioned Japanese Patent Publication No. Sho. 52-33523. This known method comprises an individual switching control for plural fine lighting points disposed above a record film transversely of the light beam scanning direction, the control being thereby effected by means of dot signals read out of a memory corresponding to picture signals so as to produce a half-tone image. In the above application, network signals may be compared with the signals originating from divisional elements in a fine network pattern.

The foregoing description is focused on a record of half-tone images by means of a screen set at an angle of 0° for convenience of easier understanding. The invented method can be easily applied also at other screen angles, for example 15°, 45° or 75°, available in multi-color printing wherein the tangents (tan $\theta$) of these angles are approximated to a ratio of integers. For example in a case where ten light beams are provided for recording images and the fine network pattern is partitioned into checkered patterns, there will be provided with 520 divisional elements in a unit area corresponding to a single dot, to which one of the network patterns is applied, for the screen angles 15° and 75° whilst 528 elements are provided for the screen angle 45°. Even when each of these integral patterns may be separated into two coarser networks, the resultant patterns will have more than 260 divisional elements. Therefore, a sufficiently smooth tone reproducibility will be acquired even when only one of separated patterns is used, if the diameter of lighting beams is made a little larger than that in usual case.

Further applicabilities of the invention are illustrated in FIGS. 11 and 12 where a combination of three kinds A, B and C or four kinds A, B, C and D of fine network patterns having different tone characteristics is proposed for a gradual control of the density in the small dot fringes adapted for dot etching. It needs naturally to increase the diameters of exposure light beams in consideration of the number of network patterns used stepwise in order, or at the same time.

It is also possible to adopt a reversed mode of control where the light beams are switched on when the numeral signal m are larger than the reference value n whereby effects and functions similar to those in the ordinary control will be given.

The invented method is composed in such a manner as heretofore described so that it is now possible to record half-tone images consisting of softer dots having fringes in their circumferential ranges. The small dots thus produced are favorably different from the hard dots made by the known electronical method for half-tone images, namely the former being adapted for dot etching while the latter being not. Moreover, the invented method can be performed with use of a circuit simpler than that in the aforementioned U.S. Pat. No. 4,025,189 and with a higher speed.

What is claimed is:

1. A method for making half-tone printing plates, the method comprising a step of controlling individually each of plural fine lighting points disposed above recording films transversely of the scanning direction of light beams in such a manner as to switch on and off the lighting points in accordance with such image signals or dot signals corresponding thereto that originate from an original picture to be recorded, characterized in that a unit area corresponding to a single dot area is divided into plural fine network patterns wherein the patterns are different from each other in their tone reproduction characteristics and are respectively composed of many divisional elements defined so as not to overlap each other, and that the light beams are controlled to be switched on and off according to a reference signal corresponding to one of said sequential image signals and also according to other signals from said fine network patterns wherein the latter signals are defined to alter in correspondence with such positions in the single dot unit area that are to be exposed to said light beams.

2. A method as set forth in claim 1 wherein said plural fine network patterns each having a tone reproduction characteristic different from each other are charged into a single memory device, the patterns being composed of the divisional elements defined so as not to overlap each other.

3. A method as set forth in claim 1 wherein said plural fine network patterns each having a tone reproduction characteristic different from each other are respectively charged into different memory devices, the patterns being composed of the divisional elements defined so as not to overlap each other.

4. A method as set forth in any of claims 1 to 3 wherein the diameters of said light beams to be irradiated onto the recording films are determined such that the divisional elements to be prevented from being exposed are also exposed to the light beams irradiating onto the neighboring divisional elements.

* * * * *